United States Patent
Stamper

[19]

[11] Patent Number: 6,036,194
[45] Date of Patent: Mar. 14, 2000

[54] COMBUSTION GAS SEAL FOR AN INTERNAL COMBUSTION ENGINE

[75] Inventor: Billy L. Stamper, Columbus, Ind.

[73] Assignee: Cummins Engine Company, Inc., Columbus, Ind.

[21] Appl. No.: 08/922,569

[22] Filed: Sep. 3, 1997

Related U.S. Application Data

[63] Continuation-in-part of application No. 08/714,766, Sep. 16, 1996, abandoned.

[51] Int. Cl.[7] .................................................. F16J 15/32
[52] U.S. Cl. ........................ 277/595; 277/593; 277/601; 123/41.84; 123/193.3
[58] Field of Search ..................... 277/593, 601, 277/591, 595, 598; 123/41.84, 193.3, 193.2, 193.1

[56] References Cited

U.S. PATENT DOCUMENTS

| | | |
|---|---|---|
| 2,553,222 | 5/1951 | Wallgren et al. . |
| 2,679,241 | 5/1954 | Dickson . |
| 2,863,439 | 12/1958 | Bischel ................................. 123/193 |
| 2,972,341 | 2/1961 | Forst . |
| 3,330,568 | 7/1967 | Wetzel . |
| 3,340,774 | 9/1967 | Brenneke ................................. 92/171 |
| 3,519,278 | 7/1970 | Fuhrmann et al. . |
| 3,606,361 | 9/1971 | Pohl et al. . |
| 3,661,135 | 5/1972 | Weiss ..................................... 123/193 |
| 3,747,963 | 7/1973 | Shivak . |
| 4,494,491 | 1/1985 | Takada et al. . |
| 4,656,982 | 4/1987 | Mirjanic . |
| 4,867,118 | 9/1989 | Kubis et al. ..................... 123/193 CH |
| 4,917,062 | 4/1990 | Tapper et al. . |
| 5,010,853 | 4/1991 | Kubis et al. ......................... 123/41.84 |
| 5,112,066 | 5/1992 | Remmerfelt . |
| 5,125,375 | 6/1992 | Vuk . |
| 5,221,097 | 6/1993 | Ishikawa et al. . |
| 5,275,139 | 1/1994 | Rosenquist . |
| 5,294,134 | 3/1994 | Kawaguchi et al. . |
| 5,410,997 | 5/1995 | Rosenquist . |
| 5,517,958 | 5/1996 | Iikura . |

FOREIGN PATENT DOCUMENTS

| | | |
|---|---|---|
| 547339-A1 | 6/1993 | European Pat. Off. . |
| 1.423.016 | 11/1965 | France . |
| 1238290 | 4/1967 | Germany . |
| 1912106 | 10/1969 | Germany . |
| 3530372 | 3/1987 | Germany . |
| 61-2411445 | 10/1986 | Japan ..................................... 277/593 |
| 1481-451 | 5/1989 | Switzerland . |
| 2087023 | 5/1982 | United Kingdom . |

*Primary Examiner*—Daniel G. DePumpo
*Attorney, Agent, or Firm*—Sixbey, Friedman, Leedom & Ferguson PC; Charles M. Leedom, Jr.; Donald R. Studebaker

[57] ABSTRACT

A combustion seal for sealing high pressure combustion gas within at least one cylinder of an internal combustion engine including a cylinder block, a cylinder head having a groove formed in its bottom face, a cylinder liner having a complementary groove formed in its top face, and a O-ring formed from a ductile material and positioned between and contacting each edge of the groove formed in the cylinder head and the complementary groove formed in the cylinder liner, wherein the O-ring is compressed when the cylinder head is secured on the cylinder such that the O-ring has multiple radial restraint points of contact with the edges. When securing the cylinder head onto the cylinder block, the O-ring is positioned between the grooves in the cylinder head and cylinder liner before a compressive force is applied. When the compressive force is applied, the O-ring deforms within the grooves such that part of the O-ring protrudes inside the grooves and part of the wire is deformed flat against the surface of the cylinder head and liner. High contact load pressure is generated at the points at which the O-ring contacts the edges of each groove, thus providing a seal for the high pressure combustion gas generated by the engine.

20 Claims, 7 Drawing Sheets

COMBUSTION GAS SEAL FOR AN INTERNAL COMBUSTION ENGINE

This application is a Continuation-In-Part application of U.S. application Ser. No. 08/714,766 filed Sep. 16, 1996 now abandoned.

TECHNICAL FIELD OF THE INVENTION

The present invention relates to a high pressure seal and more particularly, to a combustion gas seal for an internal combustion engine including an O-ring positioned between a cylinder head and cylinder liner to provide effective sealing of high combustion gas pressure.

BACKGROUND OF THE INVENTION

In order to operate efficiently and effectively, internal combustion engines must have proper seals to prohibit the release of gases or liquids that may hinder an engines performance. In particular, sealing high pressure combustion gases within a cylinder is vital to efficient operation of an internal combustion engine, and in particular, a diesel engine. Proper seals between the cylinder liner and the cylinder head are essential for a diesel engine which relies on optimal pressure and temperature conditions for igniting fuel. If the cylinder liner and cylinder head are improperly sealed, then combustion gases could leak out of the cylinders during engine operation resulting in loss of power and engine efficiency. Different apparatus and methods have been developed in an attempt to provide an effective seal at the cylinder liner and cylinder head interface. One example of this attempt is found in U.S. Pat. No. 4,917,062 to Tapper et al. which discloses the use of a resilient polymeric "O"-ring compressed within complementary rectangular grooves in the cylinder head and the engine block when the cylinder head is tightened onto the cylinder block to effect a seal. The apparatus of Tapper et al., however, is not designed to effectively seal high pressure combustion gases in an internal combustion engine. For example, Tapper et al. employ a resilient polymeric "O"-ring that can break down due to high combustion gas pressures generated in the internal combustion engine.

A further combustion seal design is found in Russian Patent Application No. SU 1,481,451 A1 to Butov which discloses a seal for a joint between the cylinder head and cylinder liner of an internal combustion engine. The seal includes a seal ring formed of a deformable material and a cylinder head and cylinder liner having a series of concentric grooves formed therein. When the cylinder head is tightened, the ridges between each of the concentric grooves press into the seal ring to provide a seal between the cylinder head and the cylinder liner. The multiple grooves on both the cylinder head and cylinder liner add to the manufacturing costs of the sealing engagement due to the precision that is involved in ensuring that the respective grooves are properly mated.

German Patent Application No. 35 30 372 A1 to Heitjohann discloses a seal for a pressurized annular gap between two cylindrical surfaces. The seal includes a ring that is held in an annular groove provided in one of the two cylindrical surfaces. The reference refers to the ring as a "soft joint" which would imply that it is made from a soft material. As such, the structure disclosed in Heitjohann suffers from the same deficiencies as Topper et al. discussed above.

Another combustion seal design is found in U.S. Pat. No. 2,553,222 to Wallgren et al. which utilizes a packing ring that is compressed into a groove formed in a cylinder portion when the cylinder head is applied and secured. The packing ring comprises copper and is deformable within the cylinder groove. When the head is removed and subsequently reapplied, the packing ring may be reversed so that the ring is again pressed into the groove formed in the cylinder portion. The packing ring of Wallgren et al., however, provides only one point of seal between the cylinder head and cylinder portion, which increases the chance that high pressure combustion gases will escape from the cylinder during engine operation. As discussed above, this problem could be detrimental to engine performance and efficiency.

U.S. Pat. No. 5,275,139 to Rosenquist discloses a seal comprising a deep groove in the cylinder head and a complementary deep groove formed in the cylinder body. A loose fitting armor wrapped fire ring is positioned within the grooves of both the cylinder head and the cylinder body. The Rosenquist system is complex, in that, the seal requires a deep groove in the cylinder head as well as in the cylinder body resulting in increased manufacturing costs. In addition, the system does not use a cylinder liner, and thus, is not practical for many types of engines that use cylinder liners pressure fitted into a cylinder bore. The loose fitting armor wrap is also undesirable because it adds cost to the manufacturing process and has limited sealing capabilities.

Based on the limited teachings of the above-noted references there is a need for a combustion gas seal design that is simple to manufacture yet durable and effective in order to withstand extreme combustion gas pressure acting on the seal during engine operation. An improved seal increases engine efficiency to achieve maximum performance. Combustion seal designs that breakdown under high combustion gas pressure may result in undesirable downtime and costly repairs to the internal combustion engine. Therefore, it is imperative that a combustion seal is able to endure day-to-day engine operation and not breakdown under the high pressures and temperatures.

SUMMARY OF THE INVENTION

In view of the foregoing, it is an object of the present invention to provide an improved combustion gas seal that is simple to manufacture yet durable and effective in order to withstand extreme combustion gas pressures acting on the seal during engine operation.

It is another object of the present invention to achieve the above object and also provide an improved combustion gas seal between the cylinder head and cylinder liner of an internal combustion engine.

It is a further object of the present invention to achieve one or more of the above objects and also provide a combustion seal design which provides radial restraint points to secure a sealing ring between the cylinder head and cylinder liner while being subjected to thermal and mechanical forces that occur during engine operation.

A still further object of the present invention is to provide a combustion gas seal wherein the ancillary forces exerted on the O-ring seal during engine operation are minimized in order to protect the O-ring seal and sealing interfaces between the O-ring seal and cylinder head and the O-ring seal and the cylinder liner.

These, as well as other objects of the present invention are achieved by a combustion seal for sealing high pressure combustion gas within at least one cylinder of an internal combustion engine, comprising a cylinder block having one or more cylindrical bores formed therein, and a cylinder head having a top face and a bottom face. The cylinder head is rigidly attached to the cylinder block and has a groove formed in its bottom face. In addition, the seal includes a cylinder liner having a top face and positioned into at least one of the bores formed in the cylinder block, the cylinder liner having a complementary groove formed in its top face, and a O-ring positioned between and contacting each edge of the groove formed in the cylinder head and the complementary groove formed in the cylinder liner, wherein the O-ring is compressed when the cylinder head is secured on the cylinder such that the O-ring creates multiple radial restraint points of contact with the edges and a portion of the O-ring deforms flat against the bottom face of the cylinder head and the top face of the cylinder liner. The grooves formed in cylinder head and cylinder liner may have a V-shape, rectangular shape or a semi-circle shape. Moreover, the O-ring comprises a ductile material, such as carbon steel, alloy steel, and copper alloy. Additionally, the alloy may be heat treated utilizing known heat treatment processes such as annealing. When securing the cylinder head onto the cylinder block, the O-ring is positioned between the grooves in the cylinder head and cylinder liner before a compressive force is applied. Once the compressive force is applied, the O-ring deforms within the grooves such that part of the O-ring protrudes inside the grooves and part of the O-ring is deformed flat against the surface of the cylinder head and liner. High contact load pressure is generated at the points at which the O-ring contacts the edges of each groove, thus providing a seal for the high pressure combustion gas generated by the engine.

Preferably, a combustion gas seal in accordance with the present invention is formed including a cylinder liner having a groove formed in an upper planar surface thereof with the groove walls being extended to contact the face of the cylinder head. When an assembly load is applied to the head, the cross-sectional thickness of the metal O-ring is compressed to the depth of the groove formed in the cylinder liner. The sealing load applied to the cylinder head is determined by the depth of the groove formed in the cylinder liner and the load deflection characteristics of the metal O-ring. Additionally, the radially outward groove wall includes a first substantially vertical portion and an inclined portion extending radially outwardly from the first portion. Formed therebetween is a ridge which provides radial restraint to the O-ring and assures a reliable combustion gas seal. Further, during engine operation, thermal displacement of the cylinder head and cylinder liner cause and increase in the contact forces between the liner and head. Because each wall of the groove formed in the cylinder liner extends to the cylinder head when assembled, thermal forces acting on the O-ring seal are minimized thereby protecting the O-ring seal.

These as well as additional advantages of the present invention will become apparent from the following detailed description when read in light of the several figures.

DETAILED DESCRIPTION OF PREFERRED EMBODIMENTS

Figure 1:
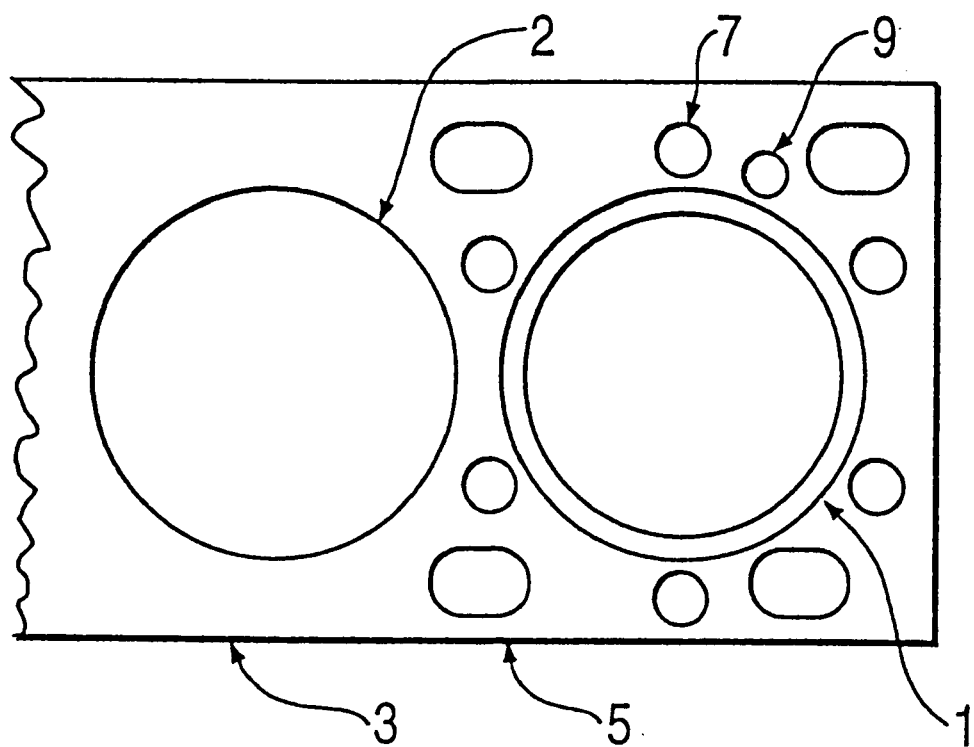
FIG. 1 is a top plan view of a head gasket configuration in accordance with the present invention.

Referring to the drawing figures, the present invention will now be explained in its several alternative embodiments. The present invention is an improved combustion seal for sealing high pressure combustion generated in an internal combustion engine by creating multiple radial restraint points of contact in the seal to overcome thermal and mechanical forces that act on the seal during engine operation.

FIG. 1 illustrates a top plan view of a combustion seal 1 in accordance with the present invention. The combustion seal 1 is shown through a head gasket 3 which consists of a body sheet or plate having multiple apertures as shown in FIG. 1. Specifically, head gasket 3 includes a cylinder hole 2 which defines the outline of a cylinder bore in which a piston (not shown) reciprocates during engine operation. Head gasket 3 further includes coolant passage 5, capscrew hole 7 and oil passage 9. These apertures provide provisions to seal the coolant, secure a cap or head onto the engine (not shown), and a provision to seal the oil. The head gasket itself provides a seal for preventing gas or liquid leakage during engine operation.

Figure 2:
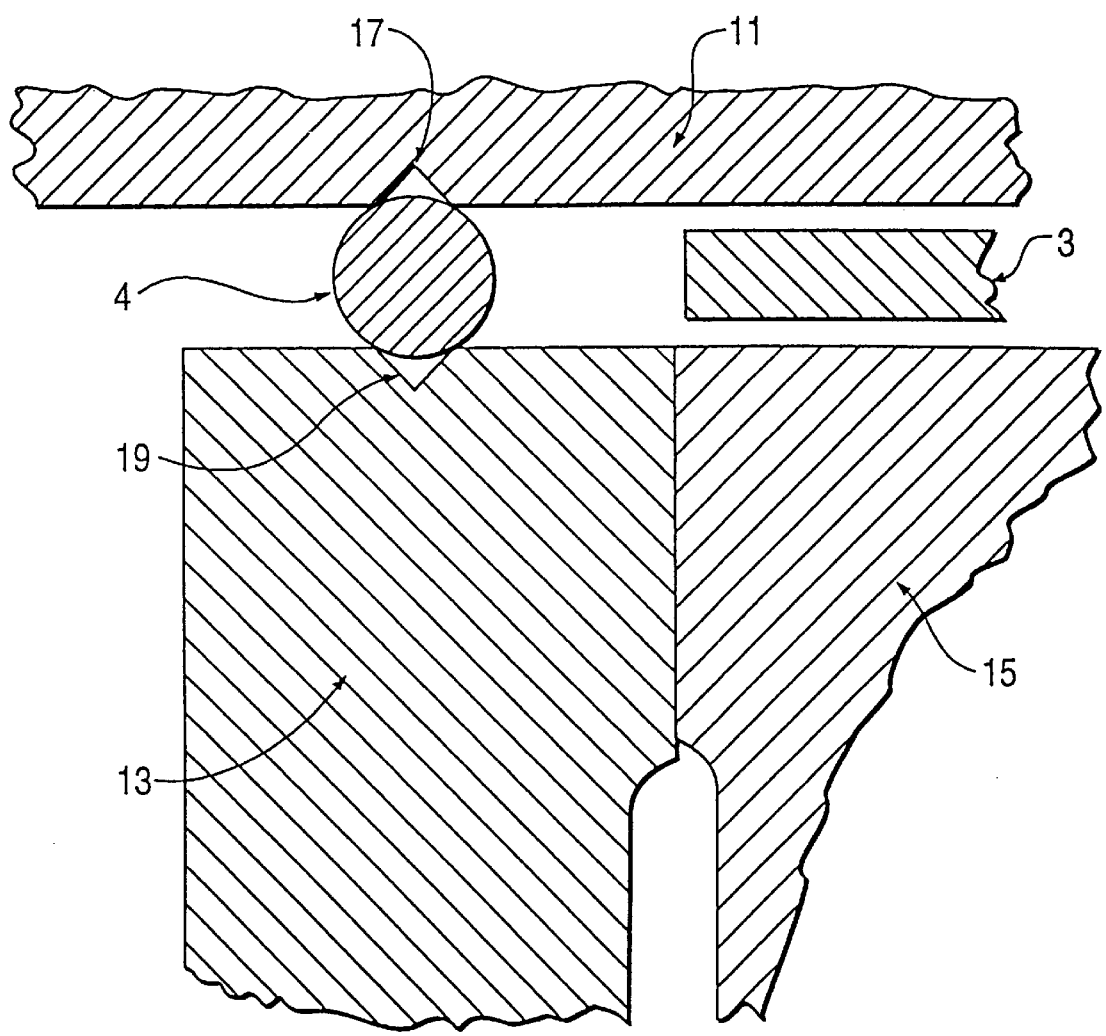
FIG. 2 is a side cross-sectional view of the combustion seal before being compressed in accordance with the present invention.

A side cross-sectional view of combustion seal 1 is illustrated in FIG. 2 in accordance with the present invention. This figure provides a view of the combustion seal components before the engine cylinders are actually sealed in order to clearly illustrate the relationship between the elements of this invention.

Referring now to FIG. 2, combustion gas seal 1 is formed using a wire ring which is sometimes referred to as a "fire ring." The fire ring has the shape of an O-ring 4 and will be described as such throughout the remainder of this disclosure. O-ring 4 seals high pressure combustion gas at the surface of the cylinder head and at the top end face of the cylinder liner. The O-ring is designed to withstand high combustion gas pressures and extreme temperatures.

In addition to O-ring 4, combustion gas seal 1 includes a cylinder head 11, a cylinder liner 13, a cylinder block 15 and head gasket 3. Cylinder head 11 comprises a metal plate which secures onto cylinder block 15 using cap screws (not shown). Cylinder block 15 is formed from a block of metal and includes one or more cylindrical bores in which cylinder liner 13 is placed. Cylinder liner 13 is in a frictional abutting relationship with cylinder block 15 such that the cylinder liner is not loosened as a result of loads generated by pistons (not shown) reciprocating therein or extreme temperature and pressure forces acting thereon. To achieve this frictional relationship, cylinder liner 13 may be press fitted in the cylinder bores of cylinder block 15 or secured by some other method. Once positioned into cylinder block 15, the top face or plane of the cylinder liner is even with that of cylinder block 15. The cylinder liner comprises a metal material, such as steel, and may be formed from a material different from that used to form the cylinder body. While this combustion seal design is shown with a wet cylinder liner having no upper flange, the same sealing concept of the present invention applies to a top-flange wet liner, dry liner, mid-stop liner and parent bore cylinder block having no separate cylinder liners.

Cylinder head 11 includes an annular groove 17 that is formed into its bottom face. Annular groove 17 is machined into the cylinder head and may have a variety of geometrical characteristics which will be discussed in greater detail with respect to FIGS. 4, 5 and 6. An important feature of this invention is the simplicity of annular groove 17 formed in the cylinder head. The groove can be easily machined because tolerances are not critical. Other advantages include durability since stresses induced in the cylinder head are be minimal and the groove can be re-machined in service.

Cylinder liner 13 includes a complementary groove 19 machined into its top face which is similar to annular groove 17 formed in cylinder head 11. Annular groove 17 and complementary groove 19 are mirror images of each other, in that, complementary groove 19 is the inverted geometrical shape of annular groove 17. Moreover, both annular groove 17 and complementary groove 19 are accurately aligned such that the grooves match with one another when the cylinder head is secured on the cylinder body. O-ring 4 is positioned between the grooves to effectuate a seal therebetween. Head gasket 3 is positioned between cylinder head 11 and cylinder body 15 to also create a seal.

To create an effective combustion seal for preventing high pressure combustion gases from escaping the cylinders during engine operation, cylinder head 11 is secured onto cylinder block 15 by using capscrews (not shown). When cylinder head 11 is first installed, O-ring 4 will have line contact at the edges of annular groove 17 and complementary groove 19. The O-ring deforms as a load is supplied by the cylinder head attachment capscrews.

O-ring 4 is formed from a ductile material such as metal. Preferably, O-ring 4 may comprise carbon steel, alloy steel, or a copper alloy. The O-ring may be manufactured by one of several methods, such as, forming a length of drawn wire into a circular shape, welding the ends of the wire together and smoothing the joint of the wire to eliminate a leak path. In addition, the O-ring may be fully machined, or cold or hot formed from a solid blank. Preferably, the alloy from which the O-ring is formed is annealed; however, any known suitable heat treatment process may be utilized.

Figure 3:
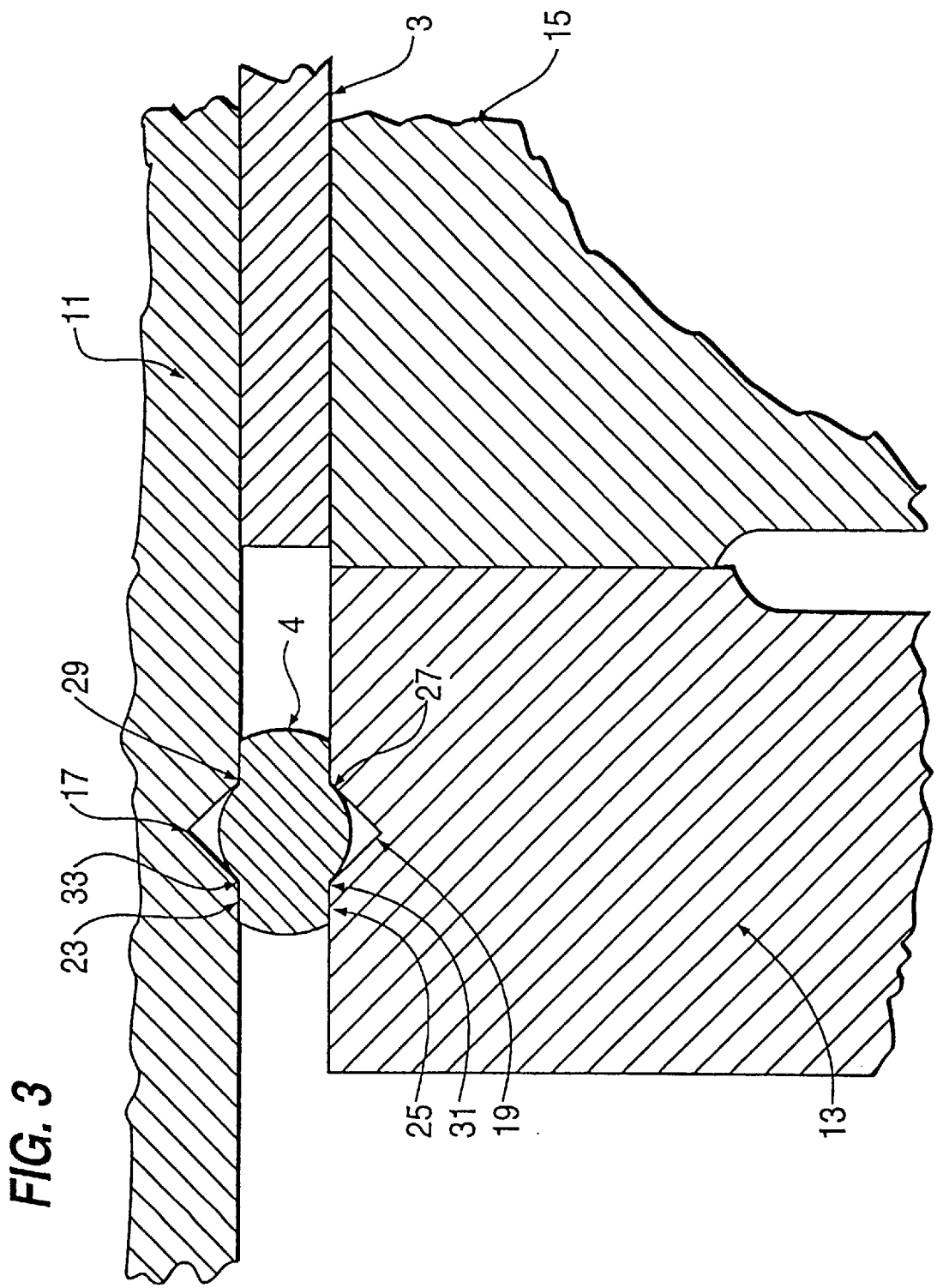
FIG. 3 is a side cross-sectional view of the combustion seal after being compressed in accordance with the present invention.

Referring to FIG. 3, after cylinder head 11 is secured onto cylinder block 15 a portion of O-ring 4 protrudes inside annular groove 17 and complementary groove 19, and a portion of O-ring 4 is deformed flat against the surface of the cylinder head at a first head surface 23 and a first liner surface 25. The same deformation occurs on the opposite side of O-ring 4 as shown in the figure. The deformation at both the head liner surfaces acts to secure and seal the O-ring between the cylinder head and cylinder liner. The deformation further acts to prevent high pressure combustion gases from leaking through combustion seal 1.

A further deformation of the O-ring occurs when the cylinder head is secured to the cylinder block to create a combustion seal. This deformation occurs at the edges of annular groove 17 and complementary groove 19. Specifically, FIG. 3 illustrates the deformation occurring at a first liner edge 27, a first head edge 29, a second liner edge 31 and a second head edge 33. As O-ring 4 deforms over the edges of the cylinder head and liner grooves, high local contact pressure is generated at these edges. This sharp load concentration produces an intimate contact between cylinder head 11 and O-ring 4, and between cylinder liner 13 and O-ring 4, thus, providing an effective seal for the high pressure combustion gas. The final compressed height of O-ring 4 may not be the same as the compressed thickness of the head gasket 3. The deformed height of O-ring 4 depends on the dimensions and deflections of the mating parts, and may vary slightly around the circumference of the O-ring 4.

Figure 4:
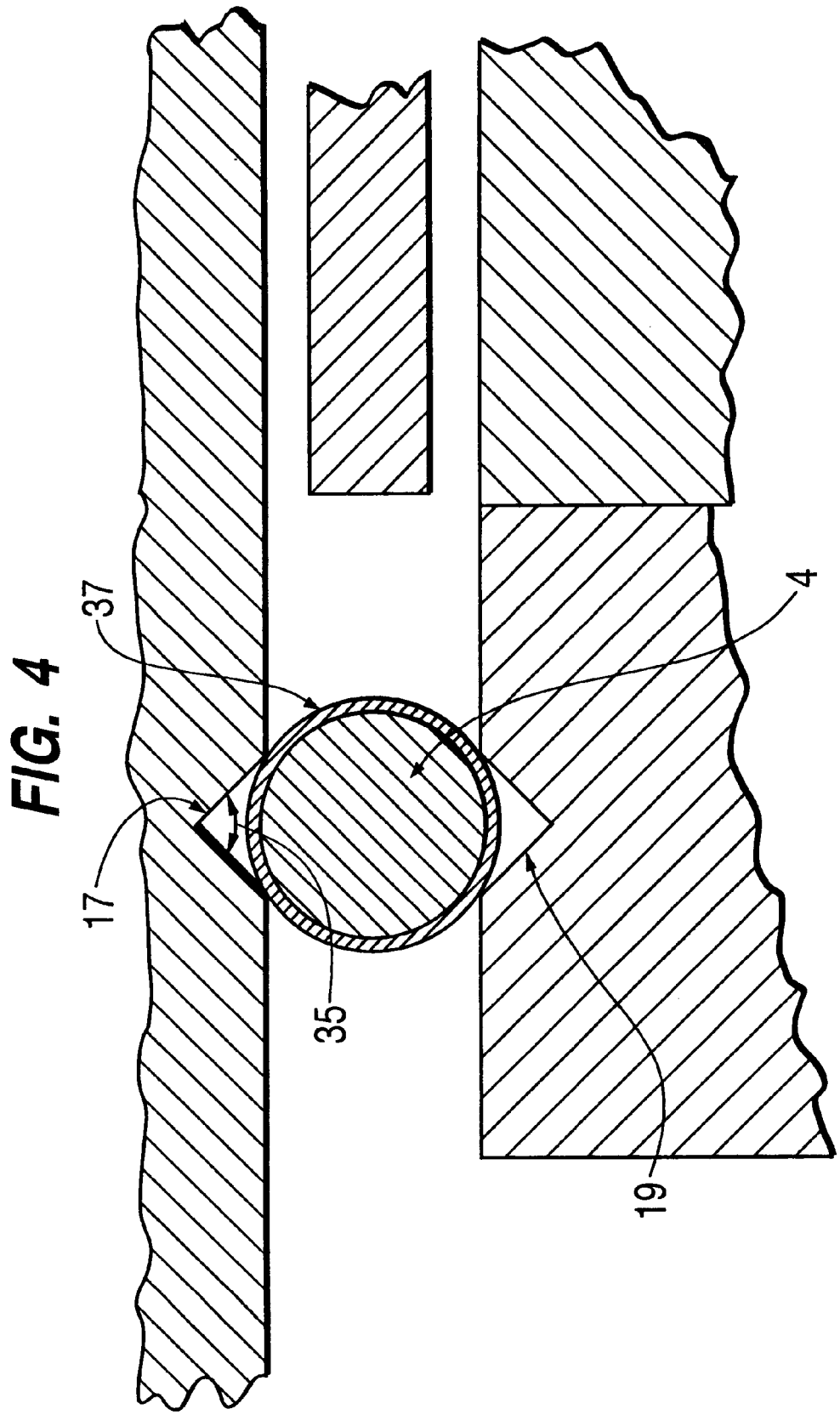
FIG. 4 is an enlarged side cross-sectional view of the combustion seal including an O-ring with a coating in accordance with an alternative embodiment of the present invention.

FIG. 4 shows an enlarged view of annular groove 17, complementary groove 19 and O-ring 4. The cylinder head and cylinder liner grooves have a triangular shape or V-notch shape. The V-notch shaped grooves allow O-ring 4 to deform into a portion of the grooves in a manner that creates a positive seal between the cylinder head and cylinder liner. With respect to the structural relationship between O-ring 4, annular groove 17 and complementary groove 19, the initial diameter of O-ring 4 may be in the range of 1.2 to 2.0 times the thickness of head gasket 3. For example, if the head gasket body is 0.25 inches in thickness, the diameter of O-ring 4 will range between 0.30 inches and 0.50 inches. Furthermore, the V-notch shaped grooves may have a width (measured from edge to edge of the groove at the faces of both the cylinder head and cylinder liner) ranging from 0.30 to 1.2 times the diameter of O-ring 4. For example, if the diameter of the O-ring is 0.50 inches, the width of the V-notch shaped grooves would range from 0.15 inches to 0.60 inches. In addition, an angle 35 of the V-notch grooves may range between 60 and 120 degrees. Of course, as the angle of V-notch groove increases so does the width discussed above. The width and angle ranges provided above for the grooves will yield a combustion seal that is able to withstand both extreme temperatures and combustion gas pressures which act on the seal during engine operation.

The O-ring in FIG. 4 includes a coating 37, such as metal plating or a similar material, which may be applied to the O-ring to better conform to surface finish details and enhance its sealing capabilities. Coating 37 may comprise zinc plating as a cost effective plating material; however, any known material may be used including silver. The coating for O-ring 4 is an alternative embodiment of the present invention and may be used for particular applications that require the structural characteristics of this additional feature.

Figure 5:
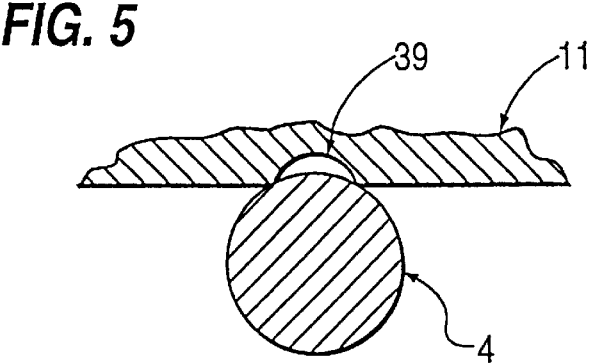
FIG. 5 is a side cross-sectional view of an O-ring and a semi-circle groove design in accordance with an alternative embodiment of the present invention.
Figure 6:
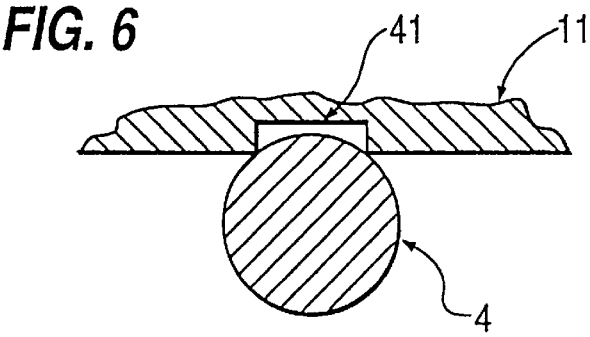
FIG. 6 is a side cross-sectional view of an O-ring and a rectangular groove design in accordance with an alternative embodiment of the present invention.

In further alternative embodiments, the cylinder head groove and cylinder liner groove may have different shapes. FIGS. 5 and 6 illustrate circular and rectangular shaped grooves, respectively, which may be used in the present invention. The grooves may be formed in the cylinder head and cylinder liner in a manner similar to that discussed above with respect to the V-notch shaped grooves. The radius of circular groove 39 shown in FIG. 5, may range from 0.3 to 0.8 times the diameter of O-ring 4. For example, if the O-ring is 0.50 inches in diameter, the radius of circular groove 39 may range from 0.15 inches to 0.40 inches. The width of circular groove 39 measured at its edges on the face of both the cylinder liner and cylinder head should be less than twice its radius.

With respect to FIG. 6, rectangular groove 41 measured at its edges on the face of the cylinder head and cylinder liner should have a width ranging from 0.3 to 1.0 times the diameter of O-ring 4. For example, if the diameter of O-ring 4 is 0.50 inches, then the width of rectangular groove 41 ranges between 0.15 inches and 0.50 inches. The depth of rectangular groove 41 may be 0.1 to 0.3 times the diameter of O-ring 4. Hence, for an O-ring having a diameter of 0.50 inches, the depth of rectangular groove 41 would range between 0.05 inches and 0.15 inches. The grooves in the cylinder head and cylinder liner need not be identical. The shape and dimensions of these grooves must be selected in relation to the O-ring diameter and head gasket thickness to achieve the correct deformation and contact characteristics of the present invention.

Figure 7:
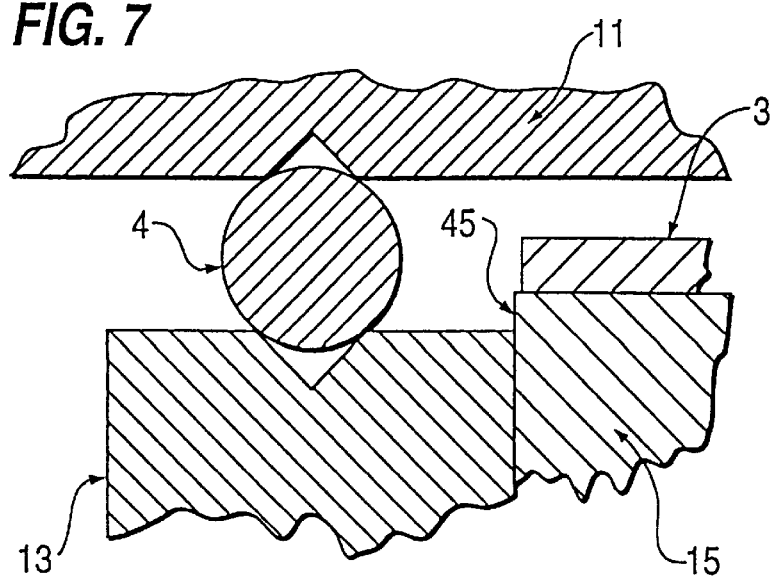
FIG. 7 is a side cross-sectional view of the combustion seal wherein the cylinder liner is recessed in the cylinder block in accordance with an alternative embodiment of the present invention.

The present invention illustrates the top of the cylinder liner 13 as essentially flush with the top surface of the cylinder block 15, as shown in FIG. 2. FIG. 7 shows an alternative embodiment having cylinder liner 13 recessed a predetermined amount 43 below the block surface. In this instance, a larger diameter O-ring 4 would be used to provide different deformation characteristics. Certain types of applications may require that the cylinder liner be recessed within the cylinder block. This alternative embodiment provides an effective high pressure combustion gas seal for these types of applications.

Figure 8:
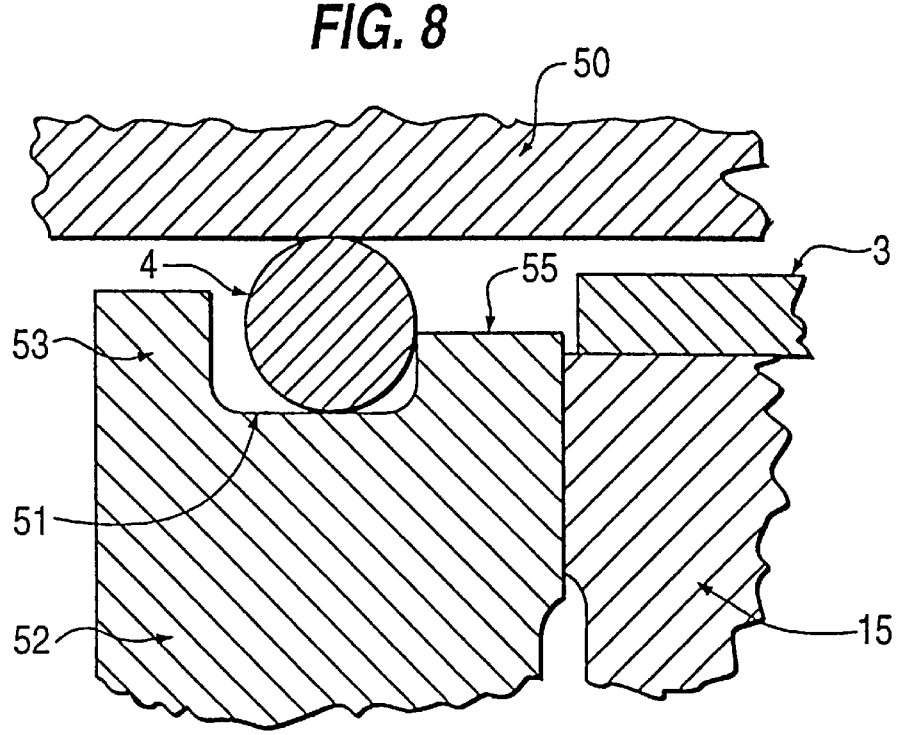
FIG. 8 is a side cross-sectional view of a combustion seal wherein an O-ring rests in a groove of the cylinder liner before being compressed in accordance with an alternative embodiment of the present invention.
Figure 9:
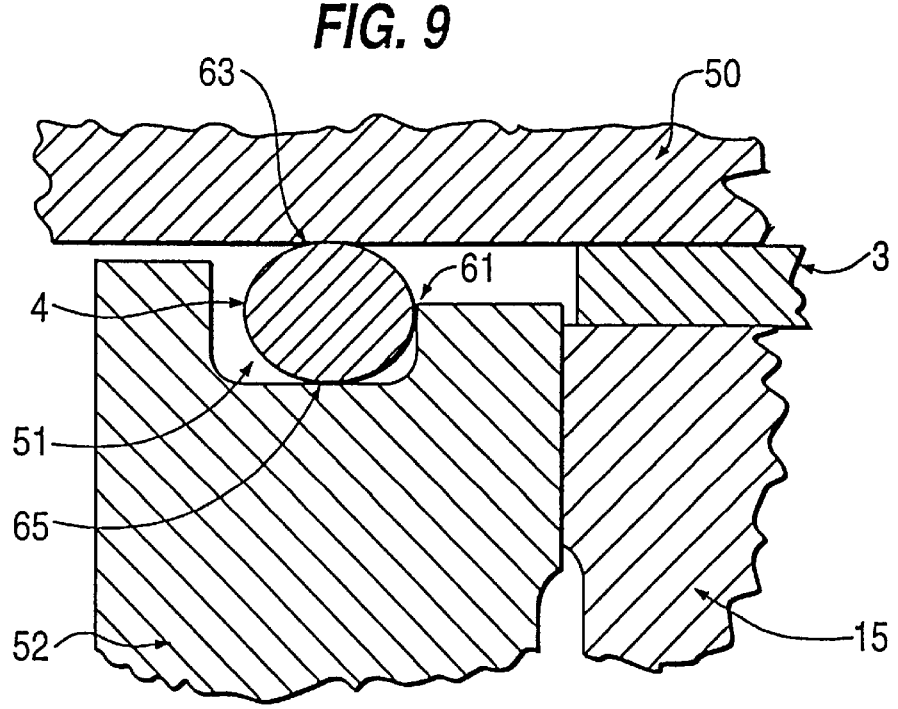
FIG. 9 is a side cross-sectional view of a combustion seal wherein the O-ring of FIG. 8 rests in a groove of the cylinder liner after being compressed in accordance with an alternative embodiment of the present invention.

Another alternative embodiment of the present invention is shown in FIGS. 8 and 9. FIG. 8 represents the initial loosely assembled components of this embodiment and FIG. 9 shows the deformed O-ring cross-section after the cylinder head cap screw preload is applied. This embodiment of the present invention is a design which excludes the groove in the bottom face of the cylinder head 50 and has only a groove 51 in the top face of cylinder bore liner 52. The design of cylinder bore liner 52 is different than the cylinder liner design of the preferred embodiment. The cylinder bore liner 52 has a structure including groove 51, a first groove side wall 53 and a second groove side wall 55 which is shorter and wider than first groove side wall 53. Although the first groove side wall 53 is optional in this embodiment this element will be discussed as part of the invention.

Another feature of this alternative embodiment discussed with regard to FIG. 8, is that cylinder bore liner 52 is slightly offset from cylinder block 15 at the point where second groove side wall 55 abuts cylinder block 15. The relationship of the top face of cylinder bore liner 52 and the top face of cylinder block 15 depends on the selection of the O-ring diameter, deformation of the O-ring cross-section, cylinder liner groove depth, and head gasket body thickness. The dimensions of the groove side walls and relationship to the cylinder block, however, may be altered in any manner which facilitates the combustion seal design and characteristics of the present invention.

Referring now to FIG. 9, as the clamping load is applied, the O-ring cross-section deforms flat against the surface of cylinder head 50 at interface 63 and cylinder liner groove 51 at interface 65. The intimate contact pattern at the formed-in-place interfaces 63 and 65, combined with radial restraint at edge point 61, provide effective sealing for high combustion gas pressure in this alternative embodiment. The depth of cylinder liner groove 51 may range between 0.4 and 0.9 times the diameter of O-ring 4. For example, if the diameter of O-ring 4 is 0.50 inches, the depth of cylinder liner groove 51 would range between 0.20 inches and 0.45 inches. The width of cylinder liner groove 51 is slightly greater than diameter of O-ring 4 to allow O-ring 4 to rest in groove 51 of the cylinder liner without contacting both groove side walls.

Figure 10:
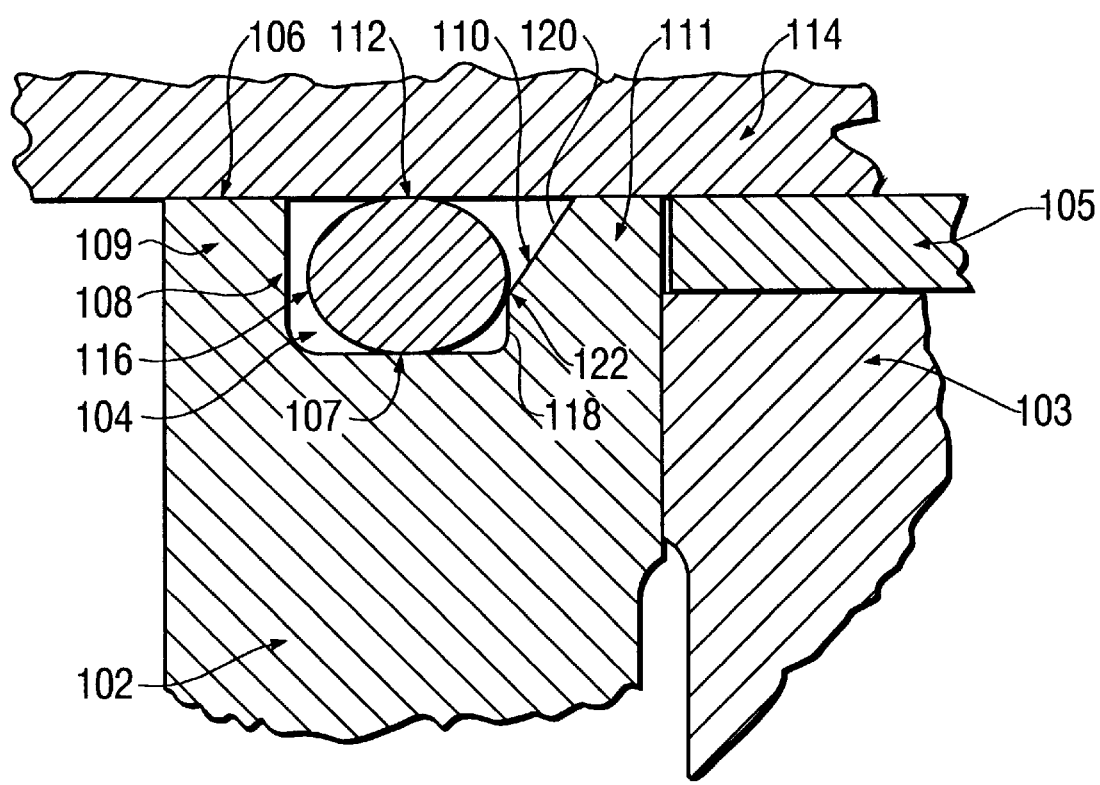
FIG. 10 is a side cross-sectional view of a combustion seal wherein an O-ring rests in a groove of the cylinder liner and is compressed by a cylinder head in accordance with a preferred embodiment of the present invention.

With reference now to FIG. 10, a preferred combustion gas seal in accordance with the present invention is illustrated and includes a cylinder liner 102 positioned in a cylinder block 103 having a groove 104 formed in an upper planar surface 106 thereof with the groove sidewalls 108 and 110 extending from a bottom wall 107 to contact a face 112 of the cylinder head 114. As with the previous embodiments, a head gasket 105 and an O-ring 116 are provided with the O-ring 116 being positioned in the groove 104 for forming a combustion gas seal about an upper periphery of the cylinder liner 102. When an assembly load is applied to the head 114, the cross-sectional thickness of the metal O-ring 116 is compressed to the depth of the groove 104 formed in the cylinder liner 102. The sealing load applied to the cylinder head 114 is determined by the depth of the groove 104 formed in the cylinder liner 102 and the load deflection characteristics of the metal O-ring 116. Additionally, the radially outward groove wall 110 includes a first substantially vertical portion 118 and an inclined portion 120 extending radially outwardly from the first portion. Formed therebetween is a ridge 122 which provides radial restraint to the O-ring 116 and assures a reliable combustion gas seal.

With the arrangement illustrated in FIG. 10, during engine operation, thermal displacement of the cylinder head 114 and cylinder liner 102 cause and increase in the contact forces between the liner and head. Because each sidewall 108 and 110 of the groove 104 formed by the extensions 109 and 111 of the cylinder liner 102 extend to and contact the cylinder head 114 when assembled, thermal forces acting on the O-ring seal are minimized thereby protecting the O-ring seal from excessive deformation which could result in leakage at the seal.

Accordingly, the combustion gas seals discussed above with regard to both the several embodiments provide an effective high pressure combustion gas seal that is durable and easy to manufacture. Further, with the combustion gas seal illustrated in FIG. 10, the seal itself is protected from being over stress due to thermal expansion of the liner and head during the operation of the internal combustion engine. Thus, the present invention has features and advantages not found in the prior art seals discussed hereinabove.

INDUSTRIAL APPLICABILITY

The wire ring seal may be employed in any environment where it is essential to create an effective seal. This particular combustion seal is even more appropriate with the existence of high pressures where the possibility of leakage is present. Application of this mechanism may be utilized in any environment where it is essential to prevent the escape of gases or liquid that are under extreme temperatures and pressures.

What is claimed is:

1. A combustion seal for sealing high pressure combustion gas within at least one cylinder of an internal combustion engine, comprising:

a cylinder block having one or more cylindrical bores having corresponding central axes formed therein;

a cylinder head having a top face and a bottom face, said cylinder head being rigidly attached to said cylinder block;

a cylinder head gasket positioned in between said cylinder block and said cylinder head for enhancing the seal therebetween;

a cylinder liner having a top face and pressure fitted into at least one of said bores formed in said cylinder block, said cylinder liner having a groove formed in said top face, said groove having a first sidewall and a second sidewall positioned radially outward of said first sidewall, said second sidewall having a first section oriented generally parallel with the central axis of the cylindrical bore and a second section inclined in cross-section at an angle less than 90° with respect to said first section to form a ridge at the intersection of said first and second sections; and a metal O-ring positioned in said groove formed in said cylinder liner, said O-ring being in an abutting relationship with said second sidewall of said groove, said O-ring having a curvilinear cross-section;

wherein said O-ring is compressed when said cylinder head is secured on said cylinder block such that said curvilinear cross-section of said O-ring is deformed including deformation around said ridge to create at least a three point seal.

2. The seal of claim 1, wherein said O-ring comprises a ductile metal.

3. The seal of claim 2, wherein said ductile metal comprises at least one of carbon steel, alloy steel, and copper alloy.

4. The seal of claim 3, wherein said ductile metal is heat treated.

5. The seal of claim 1, wherein the diameter of said O-ring is 1.2 to 2.0 times the thickness of said cylinder head gasket.

6. The seal of claim 1, wherein said O-ring comprises an inner core with an outer coating.

7. The seal of claim 6, wherein said outer coating is a metal plating.

8. The seal of claim 1, further comprising a circumferential ridge between said first section and said second section of said second sidewalls.

9. The seal of claim 8, wherein one of the points of said three point contact is a contact between said O-ring and said ridge.

10. The seal of claim 1, wherein a top surface of said cylinder liner contacts a bottom surface of said cylinder head.

11. The seal of claim 10, wherein said groove divides said top surface of said cylinder liner into first and second top sections.

12. The seal of claim 11, wherein both said first and second sections of said top surface are in contact with said cylinder head.

13. The seal of claim 1, wherein said second section is inclined radially outwardly with respect to said first section.

14. The seal of claim 1, wherein said O-ring comprises an inner core with an outer coating.

15. The seal of claim 14, wherein said outer coating is a metal plating.

16. A combustion seal for sealing high pressure combustion gas within at least one cylinder of an internal combustion engine, comprising:

a cylinder block having one or more cylindrical bores formed therein;

a cylinder head having a top face and a bottom face, said cylinder head being rigidly attached to said cylinder block;

a cylinder head gasket positioned in between said cylinder block and said cylinder head for enhancing the seal therebetween;

a cylinder liner having a top face and pressure fitted into at least one of said bores formed in said cylinder block, said cylinder liner having a groove formed in said top face, said groove having a first sidewall and a second sidewall positioned radially outward of said first sidewall, said second sidewall having a first substantially vertical section and a second inclined section; and a metal O-ring positioned in said groove formed in said cylinder liner, said O-ring being in an abutting relationship with at least one of said sidewalls of said groove, wherein said O-ring is compressed when said cylinder head is secured on said cylinder such that said O-ring creates at least a three point seal;

wherein a top surface of said cylinder liner contacts a bottom surface of said cylinder head.

17. The seal of claim 16, wherein said groove divides said top surface of said cylinder liner into first and second top sections.

18. The seal of claim 17, wherein both said first and second sections of said top surface are in contact with said cylinder head.

19. The seal of claim 17, wherein said first section of said cylinder liner is positioned radially inwardly of said top section and wherein said first top section is the section which contacts the bottom surface of said cylinder head.

20. A combustion seal for sealing high pressure combustion gas within at least one cylinder of an internal combustion engine, comprising:

a cylinder block having one or more cylindrical bores formed therein;

a cylinder head having a top face and a bottom face, said cylinder head being rigidly attached to said cylinder block;

a cylinder head gasket positioned in between said cylinder block and said cylinder head for enhancing the seal therebetween;

a cylinder liner having a top face and pressure fitted into at least one of said bores formed in said cylinder block, said cylinder liner having a groove formed in said top face, said groove having a first sidewall and a second sidewall positioned radially outward of said first sidewall, said second sidewall having a first substantially vertical section and a second inclined section; and a metal O-ring positioned in said groove formed in said cylinder liner, said O-ring being in an abutting relationship with at least one of said sidewalls of said groove, wherein said O-ring is compressed when said cylinder head is secured on said cylinder such that said O-ring creates at least a three point seal;

wherein said second section is inclined radially outwardly with respect to said first section.

* * * * *